United States Patent [19]
Furuta et al.

[11] Patent Number: 5,079,295
[45] Date of Patent: Jan. 7, 1992

[54] THERMOPLASTIC RESIN COMPOSITION

[75] Inventors: Motonobu Furuta; Takeshi Maruyama, both of Ichihara, Japan

[73] Assignee: Sumitomo Chemical Company, Limited, Osaka, Japan

[21] Appl. No.: 393,791

[22] Filed: Aug. 15, 1989

[30] Foreign Application Priority Data

Aug. 24, 1988 [JP] Japan .................. 63-211474
Nov. 14, 1988 [JP] Japan .................. 63-287130

[51] Int. Cl.⁵ .............. C08L 51/06; C08L 53/00; C08L 71/12
[52] U.S. Cl. ................... 525/68; 525/92; 525/148; 525/152; 525/284; 525/285; 525/301; 525/316; 525/322; 525/323; 525/905
[58] Field of Search .............. 525/68, 92, 905, 148, 525/152

[56] References Cited

U.S. PATENT DOCUMENTS 4,102,850  7/1978  Cooper et al. .
4,454,284  6/1984  Ueno et al. .
4,460,743  7/1984  Abe et al. .

FOREIGN PATENT DOCUMENTS 0052854  6/1982  European Pat. Off. .
0329423  8/1989  European Pat. Off. .
3300232  8/1983  Fed. Rep. of Germany .
63-122756  5/1963  Japan .
49-75663  7/1974  Japan .
60-118739  6/1985  Japan .
60-120748  6/1985  Japan .
61-47748  3/1986  Japan .

*Primary Examiner*—Jacob Ziegler
*Attorney, Agent, or Firm*—Birch Stewart Kolasch & Birch

[57] ABSTRACT

A thermoplastic resin composition having excellent heat resistance and impact resistance as well as having excellent rigidity, chemical resistance and processibility, comprising:

(a) a polyphenylene ether resin or a resin composition containing a polyphenylene ether, (b)
  (i) a modified propylene polymer grafted with a styrene-based monomer and an unsaturated carboxylic acid or its derivative, or
  (ii) a propylene-based resin composition containing the modified propylene polymer and a propylene polymer, and (c) a rubbery substance. The thermoplastic resin compositions not only have good mold-processibility but also exhibit well-balanced physical properties when molded into articles.

11 Claims, No Drawings

THERMOPLASTIC RESIN COMPOSITION

BACKGROUND OF THE INVENTION a) Field of the Invention

The present invention relates to a novel thermoplastic resin composition which can be utilized as a material for producing molded articles by injection molding, extrusion molding or the like process.

b) Prior Art

Generally, polyphenylene ethers are excellent in heat resistance, hot water resistance, dimension stability, and mechanical and electrical properties. On the other hand, they have disadvantages; for example, they show unsatisfactory moldability due to their high melt viscosity, poor chemical resistance, and low impact resistance.

Known methods for improving moldability by lowering the melt viscosity of polyphenylene ethers while maintaining their excellent properties include use of a mixture of a polyphenylene ether and a polystyrene resin. However, these known methods still fail to improve chemical resistance.

On the other hand, propylene polymers are not only excellent in various properties such as moldability, toughness, water resistance, chemical resistance, etc., but also they have low specific gravity and are cheap in cost; they have been widely used as a material for preparing various molded articles, films, sheets, etc.

However, the propylene polymers have defects or points which need to be improved in heat resistance, rigidity, impact resistance, coatability, adhesiveness, etc., which presents an obstacle in developing new practical utility. In particular, improvement in the heat resistance and impact resistance thereof is strongly desired.

Naturally, it may be expected to blend a polyphenylene ether and a propylene polymer to prepare a resin composition which could have the advantages of both polymers and which could have improved moldability and impact resistance, and thus a wide possibility of new applications would be open.

Blending a polyphenylene ether with a propylene polymer, however, actually gives rise to a resin composition in which the miscibility of both polymers is poor so that molded articles obtained from such a blend as by injection molding suffers phase separation between the polyphenylene ether and the polypropylene, thereby providing articles having extremely poor appearance and poor mechanical properties, which are unsatisfactory for practical purposes.

On the market, there is increasing demand for resin compositions which retain excellent heat resistance derived from polyphenylene ether and in addition, high impact resistance and excellent weatherability.

A method for improving the miscibility between a polyphenylene ether and a propylene polymer is known, as described in Japanese Patent Application No. 63-33445, in which method a polyphenylene ether is blended with a propylene polymer grafted with a styrene based monomer by graft copolymerization. This method, however, fails to provide a composition having excellent impact resistance.

As described in Japanese Patent Publication (Kokai) No. 57-108153, a method is known in which polyphenylene ether is blended with a copolymer of an olefin and glycidyl methacrylate and/or glycidyl acrylate, and a method is also known in which polyphenylene ether is blended with a rubbery substance in order to improve its impact resistance. However, both of these methods fail to provide resin compositions which have satisfactory heat resistance and impact resistance.

In view of the above points, the present inventors have studied intensively and extensively in order to develop effective technology for improving the properties of resin compositions made of polyphenylene ethers and propylene polymers, and as the result they have completed the present invention.

SUMMARY OF THE INVENTION

Therefore, the present invention provides a thermoplastic resin composition having excellent heat resistance and impact resistance as well as excellent rigidity, chemical resistance and processibility, comprising:

(a) a polyphenylene ether resin or a resin composition containing a polyphenylene ether, (b)
  (i) a modified propylene polymer grafted with a styrene-based monomer and an unsaturated carboxylic acid or its derivative, or
  (ii) a propylene based resin composition containing the modified propylene polymer and a propylene polymer, and (c) a rubbery substance.

DETAILED DESCRIPTION OF THE INVENTION

The polyphenylene ether used in the present invention as component (a) is a polymer obtainable by oxidative polymerization of at least one phenol compound represented by the general formula (1)

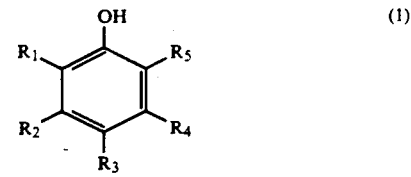

wherein $R_1$, $R_2$, $R_3$, $R_4$ and $R_5$ each represents a hydrogen atom, a halogen atom, a hydrocarbon group or a substituted hydrocarbon group, provided that one of $R_1$, $R_2$, $R_3$, $R_4$ and $R_5$ is a hydrogen atom, with oxygen or an oxygen-containing gas using an oxidative coupling catalyst.

Specific examples of the groups represented by $R_1$, $R_2$, $R_3$, $R_4$ and $R_5$ include a hydrogen atom, chlorine, bromine, fluorine, iodine, a methyl group, an ethyl group, an n- or iso-propyl group, a pri-, sec- or tert-butyl group, a chloroethyl group, a hydroxyethyl group, a phenylethyl group, a benzyl group, a hydroxymethyl group, a carboxyethyl group, a methoxycarbonylethyl group, a cyanoethyl group, a phenyl group, a chlorophenyl group, a methylphenyl group, a dimethylphenyl group, an ethylphenyl group, an allyl group, etc.

Specific examples of the phenol compounds represented by the general formula (1) include phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-tert-butylphenol, thymol, 2-methyl-6-allylphenol, etc. In addition, as the polyphenylene ether constituting the component (a), there may be used those phenol compounds outside the scope of the general formula (1), for example, those obtainable by copolymerizing a polyhydroxy aromatic compound such as bisphenol A, tetra-bromobisphenol A, resorcin, hydroquinone, novolak resin, etc. with one of the compounds represented by the general formula (1).

Of the above-described polyphenylene ethers, preferred examples include homopolymers of 2,6-dimethylphenol or 2,6-diphenylphenol, or copolymers of a large amount of 2,6-xylenol and a small amount of 3-methyl-6-tert-butylphenol or 2,3,6-trimethylphenol.

The oxidative coupling catalyst which can be used in the oxidative polymerization of the phenol compounds is not limited particularly, but any catalysts can be used that can catalyze such polymerization reaction. Representative examples thereof include catalysts comprising a copper (I) salt and a tertiary amine such as copper (I) chloride-triethylamine and copper (I) chloride-pyridine, catalysts comprising a copper (II) salt, an amine and an alkali metal hydroxide such as copper (II) chloride-pyridine-potassium hydroxide, catalysts comprising a manganese salt and a primary amine such as manganese chloride-ethanolamine and manganese acetate-ethylenediamine, catalysts comprising a manganese salt and an alcoholate or phenolate such as manganese chloride-sodium methylate and manganese chloride-sodium phenolate, catalysts comprising a cobalt salt and a tertiary amine, and the like.

It is known that the physical properties and the like of polyphenylene ethers vary depending on the reaction temperature of oxidative polymerization to obtain the polymer, i.e., high temperature polymerization, which is performed at temperatures higher than 40° C., and low temperature polymerization, which is carried out at temperatures not higher than 40° C., result in the production of polyphenylene ethers with different physical properties. In the present invention, both the high and low temperature polymerization reactions can be used.

The polyphenylene ethers which can be used in the present invention as the component (a) may include modified polymers in which one or more other polymers are attached to the above-described homopolymers or copolymers by graft copolymerization. For example, the modified polymers include those obtained by oxidative polymerization of the phenol compound of the general formula (1)

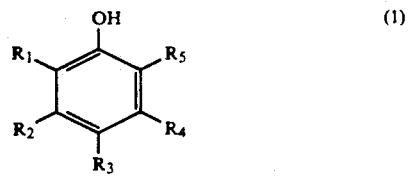
(1)

wherein $R_1$, $R_2$, $R_3$, $R_4$ and $R_5$ have the same meaning as defined above, in the presence of an ethylene-propylene-polyene terpolymer, those obtained by oxidative polymerization of the phenol compound of the general formula (1)

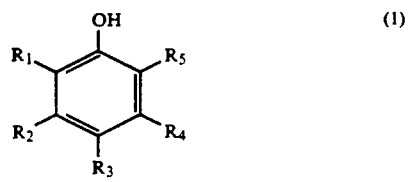
(1)

wherein $R_1$, $R_2$, $R_3$, $R_4$ and $R_5$ have the same meaning as defined above, in the presence of a polystyrene, those obtained by subjecting one or more styrene monomers and/or other monomers to organic peroxide graft polymerization in the presence of a polyphenylene ether as described in, for example, Japanese Patent Publication (Kokoku) Nos. 47-47862, 48-12197, 49-5623, 52-38596 and 52-30991, and those obtained by melt-kneading the polyphenylene ether together with the polystyrene based polymer and a radical generating agent as described in, for example, Japanese Patent Application (Kokai) No. 52-142799.

The resin composition containing the polyphenylene ether as the component (a) used in the present invention is a resin composition comprising the polyphenylene ether described above and one or more other polymers. Examples of the other polymers include polyolefins such as polymethylpentene; homopolymers or copolymers of various vinyl compounds such as polyvinyl chlorides, polymethyl methacrylates, polyvinyl acetates, polyvinylpyridines, polyvinylcarbazoles, polyacrylamides, polyacrylonitriles, ethylene-vinyl acetate copolymers, and alkenyl aromatic resins; polycarbonates, polysulfones, polyethylene terephthalates, polybutylene terephthalates, polyarylene esters (e.g., u polymer produced by UNITIKA CO., LTD.), polyphenylene sulfides; polyamides such as Nylon-6, Nylon-6,6, and Nylon-12; condensed polymers such as polyacetals. In addition, there can be enumerated various thermosetting resins such as silicone resins, fluororesins, polyimides, polyamideimides, phenol resins, alkyd resins, unsaturated polyester resins, epoxy resins, and diaryl phthalate resins.

The proportion in which the polyphenylene ether and the other polymers are mixed with each other can be varied widely, for example, in the range of 1 to 99% by weight of the polyphenylene ether and 99 to 1% by weight of the other polymers. Within this range, optimal composition and can be selected depending on the object and desired application.

The component (b) used in the present invention is a composition comprising a modified propylene polymer grafted with a styrene-based monomer and an unsaturated carboxylic acid or its derivative by graft copolymerization, or a propylene based resin composition containing the modified propylene polymer and a propylene polymer.

By the term "modified propylene polymer" is meant a copolymer comprising 100 parts by weight of propylene polymer and 0.2 to 150 parts by weight, preferably 2 to 90 parts by weight, and more preferably 3 to 70 parts by weight, of a monomer composed of 99 to 1% by weight of a styrene-based monomer and 1 to 99% by weight of an unsaturated carboxylic acid and/or its derivative and attached to the propylene polymer by graft copolymerization. When the amount of the monomer to be graft-polymerized is smaller than 0.2 part by weight, the effect of modification of resins is not observed. On the other hand, the chemical resistance of the resin is deteriorated when the amount of the monomer to be graft-polymerized is larger than 150 parts by weight.

The propylene polymer used in the present invention as the component (b) is a propylene homopolymer or a propylene copolymer. By the term "propylene copolymer" is meant a random or block copolymer of propylene and an α-olefin having 2 to 18 carbon atoms.

Specific examples of the propylene copolymer include ethylene-propylene copolymer, propylene-butene-1 copolymer, propylene-hexene-1 copolymer, propylene-4-methylpentene-1 copolymer, and propylene-octene-1 copolymer.

The propylene polymer may be the propylene homopolymer or the propylene copolymer alone, or it may be a mixture of one or more.

The propylene polymer may be blended with an ethylene-α-olefin copolymer, if desired. The ethylene-α-olefin copolymer to be blended is preferably one which has a density of 0.82 to 0.92 g/cm$^3$.

The styrene monomer in the component (b) which can be used in the modification of the propylene polymers most preferably is represented by the general formula (2)

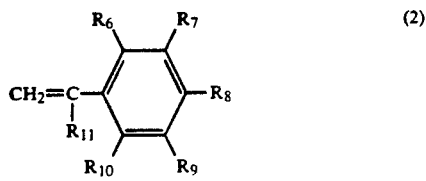

wherein $R_6$, $R_7$, $R_8$, $R_9$ and $R_{10}$, each represents a hydrogen atom, a halogen atom, an unsubstituted or substituted hydrocarbyl group, or an unsubstituted or substituted hydrocarbyloxy group, and $R_{11}$ represents a hydrogen atom, or a lower alkyl group having 1 to 4 carbon atoms.

Specific examples of $R_6$, $R_7$, $R_8$, $R_9$ and $R_{10}$ in the general formula (2) include a hydrogen atom, a halogen atom such as chlorine, bromine and iodine, a hydrocarbyl group such as a methyl group, an ethyl group, a propyl group, a vinyl group, an allyl group, a benzyl group and a methyl-benzyl group, a substituted hydrocarbyl group such as a chloromethyl group and a bromomethyl group, a hydrocarbyloxy group such as a methoxy group, an ethoxy group and a phenoxy group, and a substituted hydrocarbyloxy group such as a monochloromethoxy group.

Specific examples of $R_{11}$ include a hydrogen atom and a lower alkyl group such as a methyl group and an ethyl group.

Specific examples of the styrene monomer include styrene, 2,4-dichlorostyrene, p-methoxystyrene, p-methyl-styrene, p-phenylstyrene, p-divinylbenzene, p-chloromethoxy-styrene, α-methylstyrene, o-methyl-α-methylstyrene, m-methyl-α-methylstyrene, p-methyl-α-methylstyrene and p-methoxy-α-methylstyrene. They may be used alone or in admixture. Of these, styrene is preferred.

Specific examples of the unsaturated carboxylic acids or the derivatives thereof include unsaturated carboxylic acids such as acrylic acid, methacrylic acid, maleic acid, itaconic acid, citraconic acid, haimic acid, bicyclo (2.2.2) -octa-5-ene-2,3-dicarboxylic acid, 4-methylcyclohexa-4-ene-1,2-dicarboxylic acid, 1,2,3,4,5,8,9,10-octahydronaphthalene-2,3-dicarboxylic acid, bicyclo (2.2.1) octa-7-ene-2,3,5,6-tetracarboxylic acid, and 7-oxabicyclo (2.2.1) hepta-5-ene-2,3-dicarboxylic acid; and derivatives of the unsaturated carboxylic acids such as acid anhydrides, esters, amides, imides and metal salts, for example, maleic anhydride, itaconic anhydride, citraconic anhydride, haimic anhydride, monoethyl maleate, monomethyl fumarate, monomethyl itaconate, dimethylaminoethyl methacrylate, dimethylaminopropyl acrylamide, acrylamide, methacrylamide, maleic acid monoamide, maleic acid diamide, maleic acid-N-monoethylamide, maleic acid-N, N-diethylamide, maleic acid-N-monobutylamide, maleic acid-N,N-dibutylamide, fumaric acid monoamide, fumaric acid diamide, fumaric acid-N-monoethylamide, fumaric acid-N,N-diethylamide, fumaric acid-N-monobutylamide, fumaric acid-N,N-dibutylamide, maleimide, N-butylmaleimide, N-phenylmaleimide, sodium acrylate, sodium methacrylate, potassium acrylate, potassium methacrylate, glycidyl methacrylate, and glycidyl acrylate.

Of these, maleic anhydride, glycidyl methacrylate and glycidyl acrylate are used advantageously.

In the present invention, there is no limitation in the method of graft-copolymerizing styrene-based monomers or unsaturated carboxylic acids or their derivatives with the propylene polymers, and any known polymerization methods can be used including, for example, suspension polymerization method, emulsion polymerization method, solution polymerization method, or block polymerization (including a method using an extruder in addition to a method using a polymerization tank).

For example, there can be used a method in which the propylene monomer, a graft monomer and a free radical initiator are mixed with each other and the resulting mixture is melt-kneaded in a melt-kneading apparatus to effect grafting; a method in which after the propylene polymer is dissolved in an organic solvent such as xylene, a graft monomer and a free radical initiator are added to the resulting solution in nitrogen gas atmosphere followed by heating for reaction with stirring, the reaction mixture is cooled after the reaction, washed by filtration and dried to obtain a grafted propylene polymer; a method in which the propylene polymer is irradiated with ultraviolet ray or radioactive rays in the presence of a graft monomer; or a method in which the propylene polymer is contacted with oxygen or ozone in the presence of a graft monomer.

In the preparation of the modified propylene polymers, there is no particular limitation for the method of graft copolymerizing styrene-based monomer and unsaturated carboxylic acid or its derivative. Specific examples of the method for the preparation of the modified propylene polymers include a method in which at first the styrene-based monomer is graft-copolymerized with the propylene polymer by the suspension polymerization method, and the resulting graft polymer and an unsaturated carboxylic acid are melt-kneaded together with a peroxide to obtain a modified propylene polymer; a method in which the styrene-based monomer is graft-copolymerized by suspension polymerization method with a graft polymer obtained by melt-kneading the unsaturated carboxylic acid and the propylene polymer to obtain a modified propylene polymer; a method in which the propylene polymer, the styrene-based monomer, the unsaturated carboxylic acid or its derivative and a peroxide are mixed, and the resulting mixture is melt-kneaded in a melt-kneading apparatus to effect graft copolymerization; and a method in which the styrene-based monomer and the unsaturated carboxylic acid or its derivative are simultaneously copolymerized with the propylene polymer by suspension polymerization method.

Alternatively, the propylene polymer, the styrene-based monomer, the unsaturated carboxylic acid or its derivative and the peroxide together with the polyphenylene ether as the component (a) and the rubbery substance as the component (c) are mixed, and the resulting mixture is melt-kneaded in a melt-kneading apparatus to effectd graft copolymerization.

Then, a method can be used in which the propylene polymer is impregnated with a free radical initiator and an unsaturated aromatic monomer beforehand, and upon kneading, an unsaturated carboxylic acid or its derivative is simultaneously fed. Also, a method is used in which the free radical initiator and/or the unsaturated carboxylic acid or its derivative are/is supplied in the midway in the extruder to modify the resin.

There is no particular limitation on the peroxide which is used in the preparation of the modified propylene polymer and appropriate peroxides can be selected freely.

For example, there can be used azo compounds such as 2,2'-azobisisobutyronitrile, 2,2'-azobis (2,4,4)-trimethylvaleronitrile, and various organic peroxides such as methyl ethyl ketone peroxide, cyclohexanone peroxide, 3,3,5-trimethylcyclohexanone peroxide, 2,2-bis(t-butylperoxy)butane, t-butyl hydroperoxide, cumene hydroperoxide, diisopropylbenzene hydroperoxide, 2,5-dimethylhexane 2,5-dihydroperoxide, di-t-butyl peroxide, 1,3-bis(t-butylperoxyisopropyl)benzene, 2,5-dimethyl 2,5-di(t-butylperoxy)hexane, 2,5-dimethyl 2,5-di(t-butylperoxy)hexyne-3, lauroyl peroxide, 3,3,5-trimethylhexanoyl peroxide, benzoyl peroxide, t-butyl peracetate, t-butyl peroxyisobutyrate, t-butyloxy pivalate, t-butyloxy-2-ethylhexanoate, t-butyl peroxy-3,5,5-trimethylhexanoate, t-butyl peroxylaurate, t-butyl peroxybenzoate, di-t-butyl peroxyisophthalate, 2,5-dimethyl 2,5-di(benzoyl peroxy)hexane, t-butyl peroxymaleate, t-butyl peroxyisopropylcarbonate, and polystyrene peroxide.

By blending the modified propylene polymer as the component (b), the thermoplastic resin of the present invention can exhibit high mechanical properties as compared with those thermoplastic resins in which the propylene polymer alone, the propylene polymer graft-polymerized with the styrene-based monomer or the propylene polymer graft-polymerized with the unsaturated carboxylic acid or its derivative is blended as the component (b).

In the present invention, various additives such as antioxidants, heat stabilizers, light stabilizers, nucleating agents, lubricants, anti-static agents, inorganic or organic coloring agents, rust preventives, crosslinking agents, foaming agents, plasticizers, fluorescent agents, surface smoothing agents, surface gloss improving agents, etc., may be added to the component (b) in the production step or the processing step thereafter, if desired.

In the thermoplastic resin composition of the present invention, the component (c) is a rubbery substance or a rubbery substance graft-copolymerized with a styrene-based monomer, an unsaturated carboxylic acid or the like.

The "rubbery substance" used herein refers to natural or synthetic polymer materials which are elastic at room temperature.

Specific examples thereof include natural rubber, butadiene polymers, butadiene-styrene copolymers (all the types of copolymers inclusive of random copolymers, block copolymers including SEBS rubber or SBS rubber, etc., graft copolymers, etc.) or their hydrogenated products, isoprene polymers, chlorobutadiene polymers, butadiene-acrylonitrile copolymers, isobutylene polymers, isobutylene-butadiene copolymers, isobutylene-isoprene copolymers, acrylate copolymers, ethylene-propylene copolymers, ethylene-butene copolymers, ethylene-propylene-styrene copolymers, styrene-isoprene copolymers, or their hydrogenated products, styrene-butylene copolymers, styrene-ethylene-propylene copolymers, perfluoro rubber, fluorine rubber, chloroprene rubber, butyl rubber, silicone rubber, ethylene-propylene-unconjugated diene copolymers, thiocol rubber, polyvulcanized rubber, polyurethane rubber, polyether rubber (e.g., polypropylene oxide, etc.), epichlorohydrin rubber, polyester elastomer, polyamide elastomer, epoxy group-containing copolymers, etc.

As for the rubbery substance used as the component (c) in the present invention, there can be used any products regardless of the type of production methods (e.g., emulsion polymerization methods, solution polymerization methods, etc.), and the type of catalysts used (e.g., peroxides, trialkylaluminiums, lithium halides, nickel based catalysts, etc.).

Furthermore, various types of products having different degrees of crosslinking, different proportions of microstructures (e.g., cis-structure, trans-structure, vinyl groups, etc.), or different mean rubber particle sizes can also be used.

In addition, various polymer rubbers such as copolymer rubbers including random copolymers, block copolymers, graft copolymers, etc., can be used as the rubbery substance in the present invention. Modified products of these copolymers can also be used as the rubbery substance. As for the modified copolymer rubber, there can be used, for example, those copolymers modified with a maleic anhydrides, compositions containing glycidyl acrylate, or carboxylic acid-containing compounds. In the present invention, one or more of the above-described rubbery substances inclusive of their modified products can be selected and used.

Examples of the ethylene-α-olefin copolymer rubber which can be used as the component (c) in the resin composition of the present invention include copolymer rubbers of ethylene and another α-olefin such as propylene, butene-1, pentene-1, hexene-1, 4-methylpentene-1 and octene-1, or ternary copolymer rubbers such as ethylene-propylene-butene-1 copolymer.

The ethylene content of the ethylene-α-olefin copolymer rubber is 15 to 85% by weight, preferably 40 to 80% by weight. The highly crystalline copolymer having an ethylene content of more than 85% by weight is difficult to process under ordinary rubber molding conditions while that having an ethylene content of less than 15% by weight tends to suffer increase in glass transition point (Tg), resulting in the deterioration of rubbery properties, which is not desirable. It is preferred that the ethylene-α-olefin copolymer rubber has a glass transition point of not higher than −10° C.

Also, it is possible to use ethylene-α-olefin-unconjugated diene copolymer rubber as the component (c). In this case, however, the content of the unconjugated diene need not be higher than 20% by weight. When it exceeds 20% by weight, it is disadvantageous in that the flowability of the composition is aggravated due to gelation which will occur upon kneading. As for the unconjugated diene used herein, preferred are ethylidene norbornene, dicyclopentadiene, 1,4-hexadiene, etc.

It is preferred that the number average molecular weight of the copolymer rubber is in the range of 10,000 to 1,000,000, in order for the copolymer rubber to be kneaded easily in extruders. With too small a molecular weight, the operation of the copolymer rubber upon supplying to the extruder will become difficult, and on the contrary, too large a molecular weight will decrease the flowability of the rubber, resulting in that it is difficult to process it. The Mooney viscosity ($ML_{1+4}$, 121° C.) of the copolymer rubber is preferably 5 to 120.

Although the molecular weight distribution of the copolymer rubber is not limited particularly, it ranges such that Q value (i.e., weight average molecular weight/number average molecular weight) is preferably 1 to 30, and more preferably 2 to 20.

As for the modified product of the ethylene-α-olefin copolymer rubber which can be used in the present invention as the rubbery substance for the component (c), there can be cited unsaturated dicarboxylic acid-modified ethylene-α-olefin copolymers which can be obtained by graft-adding unsaturated dicarboxylic acids to the above-described ethylene-α-olefin rubber as the starting material.

Examples of the unsaturated dicarboxylic acid include maleic anhydride, maleic acid, fumaric anhydride, citraconic anhydride, etc.

The unsaturated dicarboxylic acid or its anhydride-modified ethylene-α-olefin copolymer rubber can be prepared by known methods.

To take an example of using maleic anhydride as a modifying agent, the preparation method is explained below. That is, maleic anhydride and a free radical initiator together with an ethylene-α-olefin copolymer rubber are added to a hydrocarbon solvent and allowed to react at 60° to 150° C. for several minutes to several hours to obtain a solution containing a modified rubber. In this case, alcohols, amines, etc., may be added to convert maleic anhydride to its half ester or half amide, if desired. The solution thus obtained may be poured into a large amount of methanol, acetone, etc., to recover the modified rubber.

Alternatively, the modified copolymer rubber can be prepared by kneading maleic anhydride and a free radical initiator together with an ethylene-α-olefin copolymer rubber in an extruder. For example, 0.5 to 15 parts by weight of maleic anhydride per 100 parts by weight of the rubber and 0.005 to 1.0 part by weight of the free radical initiator per 100 parts by weight of the rubber are kneaded together with the rubber at 150° to 300° C. for several minutes to several tens of minutes to obtain a modified copolymer rubber. If necessary or desired, gelation preventives, for example, phenol based antioxidants such as 2,6-di-t-butyl-4-hydroxytoluene (BHT) may be used in combination.

In the present invention, various other types of modified ethylene-α-olefin copolymer rubbers may be used as the rubbery substance. For example, modified ethylene-α-olefin copolymer rubbers which are modified with monomer compounds selected from methyl acrylate, methyl methacrylate, allyl glycidyl ether, glycidyl methacrylate, etc., in addition to maleic anhydride referred to above. Furthermore, modified ethylene-α-olefin copolymer rubbers obtained by modifying with two or more of the monomer compounds may be used. Also, two or more members selected from the ethylene-α-olefin copolymer rubbers and the modified ethylene-α-olefin copolymer rubbers described above may be used simultaneously.

The above-described styrene monomer-grafted ethylene-α-olefin copolymer rubber can also be prepared by a method comprising dispersing in pure water minute chips or pellets of an ethylene-α-olefin copolymer rubber together with a dispersing agent, impregnating the copolymer rubber with a styrene-based monomer, and reacting them at 50° to 150° C. for 1 to 5 hours using a free radical initiator.

In the present invention, the epoxy group-containing copolymer, either alone or together with the above-described rubbery substance, can be used as the component (c).

The "epoxy group-containing copolymers" used herein refers to copolymers composed of an unsaturated epoxy compound and an ethylenically unsaturated compound.

Although no particular limitation is posed on the proportion of the unsaturated epoxy compound and the ethylenically unsaturated compound contained in the epoxy group-containing copolymer, usually it is preferred that 0.1 to 50% by weight, preferably 1 to 30% by weight, of the unsaturated epoxy compound be copolymerized.

As for the unsaturated epoxy compound, there can be used compounds which contain in the molecule both an unsaturated group capable of copolymerizing with an ethylenically unsaturated compound, and an epoxy group.

For example, unsaturated glycidyl esters represented by the general formula (3) and unsaturated glycidyl ethers represented by the general formula (4) below can be used.

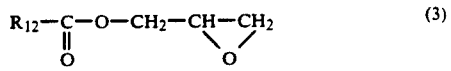

wherein $R_{12}$ represents a hydrocarbyl group having 2 to 18 carbon atoms and containing an ethylenically unsaturated bond.

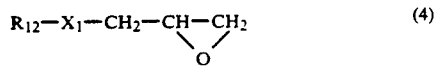

wherein $R_{12}$ represents a hydrocarbyl group having 2 to 18 carbon atoms and containing an ethylenically unsaturated bond, and $X_1$ represents —$CH_2$—O— or

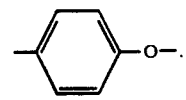

Specific examples of the compounds of the above formula include glycidyl acrylate, glycidyl methacrylate, glycidyl itaconate, allyl glycidyl ether, 2-methylallyl glycidyl ether, styrene p-glycidyl ether, etc.

On the other hand, the ethylenically unsaturated compound includes olefins, vinyl esters of saturated carboxylic acids having 2 to 6 carbon atoms, esters of acrylic or methacrylic acid with a saturated alcohol having 1 to 8 carbon atoms, maleic acid esters, methacrylic acid esters, fumaric acid esters, vinyl halides, styrenes, nitriles, vinyl ethers, acrylamides, etc.

Specific examples include ethylene, butene-1, vinyl acetate, methyl acrylate, ethyl acrylate, methyl methacrylate, dimethyl maleate, diethyl fumarate, vinyl chloride, vinylidene chloride, styrene, acrylonitrile, isobutyl vinyl ether and acrylamide. Of these, ethylene is particularly preferred. Furthermore, in order to improve the impact resistance at low temperatures of the resin composition by decreasing the glass transition point, it is preferred to use ethylene as a second component and copolymerize therewith vinyl acetate and/or methyl acrylate as a third component.

The epoxy group-containing copolymers can be prepared by various methods. For example, there can be used any of random copolymerization methods in which unsaturated epoxy compounds are introduced in the main chain of the copolymer, and graft copolymerization methods in which unsaturated epoxy compounds are introduced as side chains of the copolymer. Specific examples of the production methods include a method in which an unsaturated epoxy compound and ethylene are copolymerized in the presence of a free radical initiator at 500 to 4,000 atm at 100° to 300° C. in a suitable solvent or without solvents with or without chain transfer agents; a method in which polypropylene is mixed with an unsaturated epoxy compound and a free radical initiator, and the resulting mixture is melt graft-copolymerized in an extruder; and a method in which an unsaturated epoxy compound and an ethylenically unsaturated compound are copolymerized in an inert medium such as water or organic solvent in the presence of a free radical initiator.

The proportion in which the components (a) and (b) of the thermoplastic resin composition of the present invention are mixed with each other can be varied widely in the range of 1 to 90% by weight of the component (a) and 99 to 10% by weight of the component (b), preferably 20 to 80% by weight of the component (a) and 80 to 20% by weight of the component (b).

In the range where the component (b) is present in amounts less than 1% by weight, no improvement is observed in the processibility, while thermal properties such as heat distortion temperature decreases when the amount of the component (b) exceeds 99% by weight.

The rubbery substance as the component (c) can be used in an amount of 1 to 50 parts by weight per 100 parts by weight of the sum of the components (a) and (b).

When the rubbery substance is contained in an amount of less than 1 part by weight, the improvement of impact resistance by the addition of the rubbery substance is poor. On the other hand, with the rubbery substance in an amount of exceeding 50 parts by weight, the excellent properties which polyphenylene ether has inherently are weakened, which is not desirable.

In practicing the present invention, the thermoplastic resin composition may be kneaded together with a reinforcing agent such as glass fiber or carbon fiber, an inorganic or organic filler such as carbon black, silica or $TiO_2$, a plasticizer, a stabilizer, a flame retardant, a dye, a pigment, etc.

More particularly, the reinforcing agent is to increase mechanical and thermal properties such as bending strength, flexural modulus, tensile strength, modulus in tension, and heat distortion temperature when it is admixed. Examples thereof include alumina fiber, carbon fiber, glass fiber, high modulus polyamide fiber, high modulus polyester fiber, silicon carbide fiber, titanate whisker, etc.

As for the amount of the reinforcing agent, it is sufficient that the reinforcing agent is contained in amounts effective for reinforcing the thermoplastic resin composition and usually it is preferred to use about 5 to 100 parts by weight of the reinforcing agent per 100 parts by weight of the resin composition of the present invention.

Particularly preferred reinforcing agent is glass, and it is preferred to use glass fiber filament composed of borosilicate glass, which is made of gypsum containing a relatively small amount of sodium and aluminium. This glass is known as "Σ" glass. However, in the case where electric properties are not so important, other glass such as one known as "C" glass, which contains sodium in small amounts, is also useful. The glass fiber filament can be produced by conventional methods, for example, steam or air blowing, flame blowing, and mechanical drawing. Filaments suitable for reinforcing plastics can be produced by mechanical drawing. The diameter of the filament ranges from about 2 to 20 μm, which is not so strict in the present invention.

In the present invention, the length and form of the glass fiber filament are not limited particularly. The filaments may be stranded into multifilament fibers, which may then be stranded into threads, ropes or rovings. The filaments may also be woven to obtain mats. However, it is convenient to use glass filaments cut in the form of strands about 0.3 to about 3 cm, preferably about 0.6 cm or less, in length.

To be in detail on the flame retardant, those flame retardants useful in the present invention include a group of compounds well known to one skilled in the art.

Generally, more important compounds in the known compounds are compounds containing elements capable of imparting flame retardance such as bromine, chlorine, antimony, phosphor and nitrogen. For example, there can be used halogenated organic compounds, antimony oxide, a mixture of antimony oxide and a halogenated organic compound, a mixture of antimony oxide and a phosphor compound, a phosphor element, a phosphor compound, a mixture of a phosphor compound or a compound containing a phosphor-nitrogen bond and a halogen-containing compound, and mixtures of two or more of these.

The amount of the flame retardant is not limited particularly and it is sufficient to use it in amounts effective for imparting flame retardancy. It is disadvantageous to use too much of it since the physical properties of the resulting composition is deteriorated, i.e., the softening point of the resin composition, for example, decreases. An appropriate amount of the flame retardant is 0.5 to 50 parts by weight, preferably 1 to 25 parts by weight, and more preferably 3 to 15 parts by weight, per 100 parts by weight of the polyphenylene ether (a) or a resin composition containing the polyphenylene ether (a).

Useful halogen-containing compounds include those represented by the general formula (5)

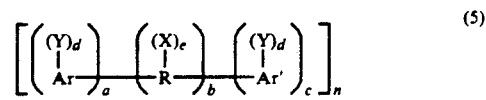

wherein n is an integer of 1 to 10, R represents a member selected from the class consisting of an alkylene group, an alkylidene group or an alicyclic group (e.g., a methylene group, an ethylene group, a propylene group, an isopropylene group, an isopropylidene group, a butylene group, an isobutylene group, an amylene group, a cyclohexylene group, a cyclopentylidene group, etc.), an ether group, a carbonyl group, an amine group, a sulfur-containing bond (e.g., sulfide, sulfoxide, sulfone, etc.), a carbonate group, and a phosphor-containing group.

R may be a group which is composed of two or more alkylene or alkylidene groups bonded to each other with a group such as an aromatic group, an amino group, an ether group, an ester group, a carbonyl group, a sulfide group, a sulfoxide group, a sulfone group, or a phosphor-containing bond. Ar and Ar' each are a monocyclic or polycyclic carbocyclic aromatic residue such as a phenylene group, a biphenylene group, a terphenylene group, or naphthylene.

Ar and Ar' may be the same or different.

Y represents a substituent group selected from the class consisting of an organic group, an inorganic group or an organometallic group. The substituent groups represented by Y may be (1) e.g., halogen atoms such as chlorine, bromine, iodine or fluorine, (2) an ether group represented by the general formula OE wherein E is a monovalent hydrocarbyl group the same as those represented by X below, (3) —OH group, (4) a monovalent hydrocarbyl group, or (5) other substituent groups such as a nitro group, or a cyano group. When d is 2 or more, plural Y's may be the same or different.

X is a monovalent hydrocarbyl group such as an alkyl group, e.g., a methyl group, an ethyl group, a propyl group, an isopropyl group, a butyl group, a decyl group, etc., an aryl group, e.g., a phenyl group, a naphthyl group, a biphenyl group, a xylyl group, a tolyl group, etc., an aralkyl group, e.g., a benzyl group, an ethylphenyl group, etc., an alicyclic group, e.g., a cyclopentyl group, a cyclohexyl group, etc., or a monovalent hydrocarbyl group containing an inert substituent group therein. When two or more X's are used they may be the same or different.

d is an integer of from 1 to the maximum number of hydrogen atoms on the aromatic ring Ar or Ar' which hydrogen atoms can be substituted.

e is 0 or an integer of 1 to the maximum number of hydrogen atoms on R which hydrogen atoms can be substituted.

a, b and c are integers inclusive of 0. When b is not 0, neither b nor C is 0. Alternatively, only one of a and c may be 0. When b is 0, the aromatic groups are bonded to each other directly through a carbon-carbon bond.

The hydroxy group or the substituent groups represented by Y on the aromatic residue Ar and Ar' may be present at any desired position(s) out of ortho-, meta- and para-positions on the aromatic ring.

Specific examples of the compound represented by the general formula (5) include the following compounds:
2,2-Bis(3,5-dichlorophenyl)propane,
Bis(2-chlorophenyl)methane,
1,2-Bis(2,6-dichlorophenyl)ethane,
1.1-Bis(4-iodophenyl)ethane,
1,1-Bis(2-chloro-4-iodophenyl)ethane,
1,1-Bis(2-chloro-4-methylphenyl)ethane,
1,1-Bis(3,5-dichlorophenyl)ethane,
2,2-Bis(3-phenyl-4-bromophenyl)ethane,
2,3-Bis(4,6-dichloronaphthyl)propane,
2,2-Bis(2,6-dichlorophenyl)pentane,
2,2-Bis(3,5-dichlorophenyl)hexane,
Bis(4-chlorophenyl)phenylmethane,
Bis(3,5-dichlorophenyl)cyclohexylmethane,
Bis(3-nitro-4-bromophenyl)methane,
Bis(4-hydroxy-2,6-dichloro-3-methoxyphenyl)methane,
2,2-Bis(3,5-dibromo-4-hydroxyphenyl)propane,
2,2-Bis(3,5-dichloro-4-hydroxyphenyl)propane, and
2,2-Bis(3-bromo-4-hydroxyphenyl)propane.

In addition, there can be used those bis-aromatic compounds which contain a sulfide group, a sulfoxy group, etc., in place of the two aliphatic groups contained in the above-described specific examples, for example, tetrabromobenze, hexachlorobenzene, hexabromobenzene, 2,2'-dichlorobiphenyl, 2,4'-dibromobiphenyl, 2,4'-dichlorobiphenyl, hexabromobiphenyl, octabromobiphenyl, decabromobiphenyl, halogenated diphenyl ether containing 2 to 10 halogen atoms, oligomers composed of 2,2-bis(3,5-dibromo-4-hydroxyphenyl)propane and phosgene and having a degree of polymerization of 1 to 20, etc.

The halogen compound which is preferable as a flame retardant in the present invention includes aromatic halogenated compounds such as chlorinated benzene, brominated benzene, chlorinated biphenyl, chlorinated terphenyl, brominated biphenyl, and brominated terphenyl, compounds containing two phenyl nuclei separated by an intervening divalent alkylene group and also containing at least two chlorine or bromine atoms per one phenyl nucleus, and mixtures of two or more of the above-described compounds. Particularly preferred are hexabromobenzene, chlorinated biphenyl or terphenyl, and mixtures thereof with antimony oxide.

Representative phosphoric compounds which are suitably used as a flame retadant in the present invention include compounds represented by the general formula (6) and nitrogen-containing similar compounds.

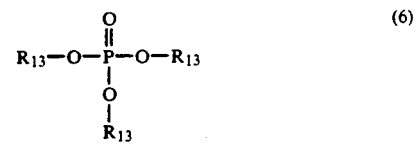

wherein R$_{13}$'s, which may be the same or different, each represent a hydrocarbyl group such as an alkyl group, a cycloalkyl group, an aryl group, an alkyl-substituted aryl group and an aryl-substituted alkyl group; a halogen atom; a hydrogen atom; or a combination of these. Suitable examples of the phosphoric acid esters include phenyl bisdodecyl phosphate, phenyl bisneopentyl phosphate, phenyl ethylene hydrogen phosphate, phenyl bis(3,5,5'-trimethylhexyl) phosphate, ethyl diphenyl phosphate, 2-ethylhexyl di(p-tolyl) phosphate, diphenyl hydrogen phosphate, bis(2-ethylhexyl) p-tolyl phosphate, tritolyl phosphate, bis(2-ethylhexyl) phenyl phosphate, tri(nonylphenyl) phosphate, phenyl methyl hydrogen phosphate, di(dodecyl) p-tolyl phosphate, triphenyl phosphate, halogenated triphenyl phosphate, dibutyl phenyl phosphate, 2-chloroethyl diphenyl phosphate, tolyl bis(2,5,5'-trimethylhexyl) phosphate, 2-ethylhexyl diphenyl phosphate, and diphenyl hydrogen phosphate. The most preferred phosphoric acid ester is triphenyl phosphate. It is also preferred to use triphenyl phosphate together with hexabromobenzene, or triphenyl phosphate together with antimony oxide.

Other flame retardant which can be used in the present invention includes compounds containing a phosphor-nitrogen bond such as phosphoric chloride azide, phosphoric ester amide, phosphoric acid amide, phosphinic acid amide, tris(aziridinyl) phosphine oxide or tetrakis(hydroxymethyl) phosphonium chloride, etc.

There is no particular limitation on the methods of preparing the resin composition of the present invention, and ordinary known methods can be used for the purpose. For example, it is effective to mix the components in the form of solutions and then evaporate the solvent or precipitate the resin in a non-solvent. On an industrial scale, however, practical method for the production uses kneading the components in a melted state. For melt-kneading, there can be used a kneading apparatus, such as mono-axial or bi-axial extruder, or various types of kneaders. High speed bi-axial extruders are particularly preferred.

Upon kneading, it is preferred to homogeneously mix the respective resin components in the form of powder or pellet in a tumbler, a Henschel mixer or a like apparatus. However, mixing may be omitted, if desired, and they are metered and fed separately to the kneading apparatus.

The kneaded resin composition can be molded by injection molding, extrusion molding or various other molding methods. The present invention, however, includes methods in which the resin components are dry blended upon injection molding or extrusion molding and directly kneaded during melt-processing operation to obtain molded articles.

In the present invention, there is no particular limitation on the order of kneading. For example, the components (a), (b) and (c) may be kneaded in a lump, or the components (a) and (b) may be kneaded previously followed by kneading the component (c). Other kneading orders may also be used.

The thermoplastic resin composition of the present invention, which is excellent in heat resistance, processibility and chemical resistance and in addition impact resistance due to the rubbery substance or epoxy group-containing copolymer blended therewith, can be molded into various articles, such as sheets, tubes, films, fibers, laminated articles, coating materials by injection molding, extrusion molding or a like method.

In particular, it can be used as interior or exterior fitting materials for automobile parts such as bumpers, instrument panels, fenders, trimms, door panels, wheel covers, side protectors, garnish, trunk lids, vonnets, roof, etc. It can also be used in machine parts which must be heat resistant. In addition, it can be used for bicycle parts such as covering material, muffler cover, leg shield, etc. Furthermore, the resin composition of the present invention can be used for electric and electronic parts which need to have high strength and heat resistance, such as housing, chasis, connectors, printed substrates, pulleys, etc.

EXAMPLES

Hereinafter, the present invention will be explained in greater detail with reference to examples which should not be construed as limiting the present invention. Tests for deflection temperature under load or heat distortion temperature (HDT), Izod impact strength (thickness: 3.2 mm) were performed according to JIS K7207 and JIS K7110, respectively.

The reduced viscosity ($\eta$ sp/c) of the polyphenylene ether in the examples was determined in a solution of chloroform of 0.5 g/dl at 25° C.

For kneading the compositions, LABO PLASTOMILL produced by TOYO SEIKI CO., LTD. (Kneading temperature: 270° C.). The composition was compression molded to prepare test pieces, which were then determined for their physical properties.

EXAMPLES 1-3 AND COMPARATIVE EXAMPLES 1 TO 3

Component (a)

Polyphenylene Ether

Polyphenylene ether having a reduced viscosity of $\eta$ sp/c=0.38 produced by Nippon Polyether Co., Ltd. is used.

Component (b)

Propylene Polymer and Modified Propylene Polymer

As the propylene polymer is used SUMITOMO NOBLEN AW564 (trade name, produced by SUMITOMO CHEMICAL CO., LTD., MI=9.0). The modified polypropylene polymer is prepared from SUMITOMO NOBLEN AW564 as follows.

That is, 1.0 part by weight of maleic anhydride, 1.0 part by weight of styrene, 1.0 part by weight of a free radical initiator composed of propylene homopolymer bearing thereon 6% by weight of 1,3-bis(t-butylperoxyisopropyl)benzene (trade name: SUNPEROX-TY13, produced by SANKEN KAKOU CO., LTD.), and 0.1% by weight of IRGANOX 1010 (trade name for a stabilizer produced by CIBA GEIGY AG), each per 100 parts by weight of polypropylene as a raw material, are mixed uniformly in a Henschel mixer, and melt kneaded at 220° C., for mean retention time of 1.5 minutes using a biaxial extruder TEX 44 SS-30BW-2V type produced by NIPPON SEIKO CO., LTD. to produce maleic anhydride.styrene-modified polypropylene having a maleic anhydride addition amount of 0.15% by weight and a melt flow rate of 23 g/10 minutes. Hereafter, this modified polypropylene is referred to as "MS-PP-1" for brevity.

Component (b)

Maleic Anhydride-Modified Polypropylene

The same procedures as above are repeated except that no styrene is used to produce maleic anhydride-modified polypropylene having a maleic anhydride addition amount of 0.09% by weight and a melt flow rate of 34 g/10 minutes. Hereafter, this modified polypropylene is referred to as "M-PP-1" for brevity.

Component (b)

Styrene-Modified Polypropylene

The same procedures as above are repeated except that no maleic anhydride is used to produce styrene-modified polypropylene having a styrene addition amount of 1.1% by weight and a melt flow rate of 31 g/10 minutes. Hereafter, this modified polypropylene is referred to as "S-PP-1" for brevity.

Component (c)

Modified Ethylene-Based Copolymer Rubber

Modified ethylene-based copolymer rubber is produced as follows.

That is, to 100 parts by weight of pellets of SUMITOMO ESPREN E-201 (trade name for ethylene-propylene copolymer rubber produced by SUMITOMO CHEMICAL CO., LTD., $ML_{1+4}$ 121° C.=27) are charged 2.0 parts by weight of maleic anhydride, 2.0 parts by weight of styrene and 1.0 part by weight of a free radical initiator composed of propylene homopolymer bearing thereon 8% by weight of 1,3- bis(t-butylperoxyisopropyl)benzene (trade name: SUNPEROX-TY13, produced by SANKEN KAKOU CO., LTD.), and mixed uniformly in a Henschel mixer, and then melt kneaded under nitrogen gas atmosphere at a kneading temperature of 250° C. and at an extrusion rate 18 kg/hour using a biaxial extruder TEX 44 SS-30BW-2V type produced by NIPPON SEIKO CO., LTD. to produce modified ethylene-polypropylene copolymer rubber having a maleic anhydride addition amount of 1.2% by weight, a styrene addition amount of 0.9% by weight and a Mooney viscosity at 121° C. ($ML_{1+4}$ 121° C.) of 41. Hereafter, this modified ethylene-polypropylene copolymer rubber is referred to as "MS-EPM-1" for brevity.

The respective components described above are blended in proportions shown in Table 1 and kneaded to obtain resin compositions. They are then compression-molded to prepare test pieces, which are measured for their physical properties. The results obtained are shown in Table 1. Table 1 clearly shows that the compositions comprised by the polyphenylene ether, the modified polypropylene or a mixture of the modified polypropylene and the polypropylene, and the modified ethylene-based copolymer rubber exhibit higher physical properties than those of the resin compositions comprised by the polyphenylene ether, the polypropylene or the maleic anhydride-modified polypropylene or the styrene-modified polypropylene, and the modified ethylene-based copolymer rubber.

EXAMPLES 4 TO 13 AND COMPARATIVE EXAMPLES 4 AND 5

Component (a)

Polyphenylene Ether

Polyphenylene ether having a reduced viscosity of $\eta$ sp/c = 0.52 produced by NIPPON POLYETHER CO., LTD. is used.

Component (b)

Modified Polypropylene

In a 10 l autoclave are charged pellets (1 kg) of SUMITOMO NOBLEN AH561 (trade name for a product by SUMITOMO CHEMICAL CO., LTD., MI = 3.0) together with 4 l of water, 100 g of syrene monomer, 5 g of maleic anhydride, 6 g of a dispersing agent (METROSE 90SH-100; trade name) and a peroxide (PERBUTYL PV; trade name), and the mixture is allowed to react at 120° C. for about 1 hour while blowing nitrogen gas in. After cooling, the reaction mixture is extracted with methyl ethyl ketone to remove polystyrene and thus grafted propylene polymer is recovered.

Hereafter, the modified polypropylene is called "MS-PP-2" for brevity.

Component (c)

Modified Ethylene-Propylene Rubber

In a stainless steel autoclave equipped with a stirrer are charged 100 parts by weight of ESPREN E-201 (trade name for a product by SUMITOMO CHEMICAL CO., LTD.; EPM, $ML_{1+4}$ 121° C. = 27, ethylene content = 47% by weight, Tg = −64° C.) as an ethylene-α-olefin copolymer rubber in the form of chips, 350 parts by weight of pure water, 4.0 parts by weight of calcium tertiary phosphate and 4.0 parts by weight of PLURONIC F-68 (trade name for a product by ASAHI DENKA CO., LTD.) and stirred with sufficient flow of nitrogen gas.

Thereafter, 30 parts by weight of styrene monomer, 2 parts by weight of maleic anhydride and 0.75 part by weight of SUNPEROX TO (trade name for a product by SANKEN KAKOU CO., LTD.) as a free radical initiator are added to the resulting reaction mixture. After elevating the temperature to 110° C. in 80 minutes, the reaction is continued for 1 hour. After cooling, styrene-grafted copolymer is taken out by filtration and the filtrate is washed sufficiently with pure water followed by drying under vacuum. The grafted product has $ML_{1+4}$ 121° C. of 55. Hereinafter, this modified ethylene propylene rubber is called "MS-EPM-2" for brevity.

Component (c)

Styrene-Modified Ethylene-Propylene Rubber

The same procedures as above are repeated except that no maleic anhydride is used to produce styrene modified ethylene-propylene rubber having a Mooney viscosity of $ML_{1+4}$ 121° C. = 53.

Hereafter, this modified ethylene-propylene rubber is called "S-EPM-1".

The respective components described above and commercially available rubbery substances are blended in proportions shown in Table 2, kneaded and molded. The physical properties of the products are measured and the results obtained are shown in Table 2. Table 2 clearly shows that the resin compositions comprised by the polyphenylene ether and the modified polypropylene and various rubbery substances blended therewith exhibit higher physical properties than those of the resin compositions comprised by the polyphenylene ether and the polypropylene and the rubbery substances blended therewith.

EXAMPLES 14 TO 16 AND COMPARATIVE EXAMPLE 6

Component (a)

Polyphenylene Ether

Polyphenylene ether having a reduced viscosity of $\eta$ sp/c = 0.43 produced by NIPPON POLYETHER CO., LTD. is used.

Component (c)

Epoxy Group-Containing Copolymer

Epoxy group-containing copolymers are produced by the following method. That is, according to the method described in Japanese Patent Publications (Kokai) Nos. 47-23490 and 48-11888, a terpolymer of ethylene-vinyl acetate-glycidyl methacrylate of 85:5:10 (% by weight) having a melt flow rate of 8 g/10 minutes (190° C., load: 2.16 kg) is produced by high pressure radical polymerization method. Hereafter, the epoxy group-containing copolymers are called "E.VA.GMA" for brevity.

The respective components are blended at proportions shown in Table 3, kneaded and molded. The products are measured for their physical properties, and the results obtained are shown in Table 3, from which it is clear that the resin compositions comprised by the polyphenylene ether and the modified polypropylene and the rubbery substance blended therewith exhibit higher physical properties than those of the resin compositions comprised by the polyphenylene ether and the polypropylene and the rubbery substance (modified ethylene-propylene copolymer).

It is also apparent that the physical properties of the resin compositions can be improved significantly by blending them with the epoxy group-containing copolymer.

EXAMPLES 17 TO 19 AND COMPARATIVE EXAMPLES 7 AND 8

As the components (a), (b) and (c) are used the following substances and blended in proportions shown in Table 4 to obtain resin compositions.

Component (a)

Polyphenylene Ether

Polyphenylene ether having a reduced viscosity of $\eta$ sp/c=0.48 produced by NIPPON POLYETHER CO., LTD. is used.

Component (b)

Propylene Polymer and Modified Propylene Polymer

As the propylene polymer is used SUMITOMO NOBLEN AV664B (trade name for propylene-ethylene block copolymer having a melt index (MI)=5.0, produced by SUMITOMO CHEMICAL CO., LTD.).

As the modified propylene polymer is used the following.

That is, in a 10 l autoclave are charged pellets (1 kg) of the above-described SUMITOMO NOBLEN AV664B (trade name) together with 4 l of water, 150 g of styrene monomer, 25 g of glycidyl methacrylate, 6 g of a dispersing agent (METROSE 90SH-100; trade name) and a peroxide (PERBUTYL PV; trade name), and allowed to react at 120° C. for about 1 hour while blowing nitrogen gas in. After cooling, styrene.glycidyl methacrylate-grafted modified propylene polymer composition is recovered. Hereafter, the polymer composition thus-obtained is referred to as "BP-1" for brevity.

For comparison, a styrene-grafted modified propylene polymer composition is separately obtained by repeating the same procedures as described above for BP-1 except that no glycidyl methacrylate is used. Hereafter, the comparative polymer composition thus-obtained is referred to as "SP-1" for brevity.

Component (c)

Rubbery Substance

As the rubbery substance are used SUMITOMO ESPREN E-512F (trade name for ethylene-propylene rubber (EPR) produced by SUMITOMO CHEMICAL CO., LTD., $ML_{1+4}$ 121° C.=66) and KRATON D-1107 (trade name for styrene-isoprene block copolymer rubber (SI) produce by SHELL CHEMICAL CO.).

The respective components are blended in proportions shown in Table 4 and kneaded to prepare various resin compositions. The resin composition thus-obtained are compression molded to produce test pieces and their physical properties are measured. The results obtained are shown in Table 4.

Table 4 clearly shows that the thermoplastic resin compositions of Examples 17 to 19 which are comprised by a mixture of the polyphenylene ether (component (a)), and the modified propylene polymer grafted with styrene and glycidyl methacrylate and if desired, propylene polymer (component (b)), the mixture being blended with the rubbery substance (component (c)) have much improved impact resistance as compared with the resin composition of Comparative Example 7 in which no styrene.glycidyl methacrylate-grafted modified propylene polymer (component (b)) is blended or the resin composition of Comparative Example 8 in which styrene-grafted modified propylene polymer (SP-1), that does not contain glycidyl methacrylate, is blended.

EXAMPLES 20 TO 27 AND COMPARATIVE EXAMPLE 9

As the components (a), (b) and (c) are used the following substances and they are blended in proportions shown in Tables 5 and 6 to obtain resin compositions.

Component (a)

Polyphenylene Ether

Polyphenylene ether having a reduced viscosity of $\eta sp/c=0.31$ produced by NIPPON POLYETHER CO., LTD. is used except for Examples 26 and 27.

In Examples 26 and 27, polyphenylene ether having a reduced viscosity of $\eta sp/c=0.43$ produced by NIPPON POLYETHER CO., LTD. is used.

Component (b)

Modified Propylene Polymer

As the raw material propylene polymer is used SUMITOMO NOBLEN FS1012 (trade name for propylene homopolymer having a melt index (MI)=1.0, produced by SUMITOMO CHEMICAL CO., LTD.).

As the modified propylene polymer is used the following. Pellets (1 kg) of the above-described propylene polymer are charged in a 10 l autoclave together with 4 l of water, 100 g of styrene monomer, 30 g of glycidyl methacrylate, 9 g of glycidyl acrylate, 8 g of a dispersing agent (METROSE 90SH-100; trade name) and a peroxide (PERBUTYL PV; trade name), and the resulting mixture is allowed to react at 120° C. for about 1 hour while blowing nitrogen gas in. After cooling, modified propylene polymer composition grafted with styrene and glycidyl methacrylate and glycidyl acrylate is recovered. Hereafter, the polymer composition thus-obtained is referred to as "BP-2" for brevity.

In addition, as the raw material propylene polymer is used SUMITOMO NOBLEN AD571 (trade name for propylene-ethylene block copolymer having a melt index (MI)=0.6, produced by SUMITOMO CHEMICAL CO., LTD.). Pellets (1 kg) of the above-described polymer are charged in a 10 l autoclave together with 4 l of water, 70 g of styrene monomer, 8 g of glycidyl methacrylate, 2.8 g of a dispersing agent (METROSE 90SH-100; trade name) and a peroxide (PERBUTYL PV; trade name), and the resulting mixture is allowed to react at 120° C. for about 1 hour while blowing nitrogen gas in. After cooling, polystyrene was extracted with methyl ethyl ketone and modified propylene polymer composition grafted with styrene and glycidyl methacrylate is recovered. Hereafter, the polymer composition thus-obtained is referred to as "BP-3" for brevity.

Component (c)

Rubbery Substance

As the rubber substance are used SUMITOMO ESPREN E-100 (trade name for ethylene-propylene rubber (EPR) produced by SUMITOMO CHEMICAL CO., LTD., $ML_{1+4}$ 121° C.=32), KRATON G-1701X (trade name for styrene-ethylene-propylene block copolymer rubber (SEP) produce by SHELL CHEMICAL CO.), natural rubber, DIENE 35A (trade name for polybutadiene (BR) produced by ASAHI KASEI CHEMICAL INDUSTRY CO., LTD.) and the modified ethylene-propylene rubber, modified ethylene-propylene-diene rubber and epoxy group containing copolymer described in the following (i), (ii) and (iii), respectively.

(i) Modified Ethylene-Propylene Rubber

In a stainless steel autoclave equipped with a stirrer are charged 100 parts by weight of ESPREN E-201 (trade name for ethylene-propylene copolymer rubber (EPR) produced by SUMITOMO CHEMICAL CO., LTD.; $ML_{1+4}$ 121° C.=27, ethylene content=47% by weight, Tg= −64° C.) in the form of chips, 350 parts by weight of pure water, 4.0 parts by weight of calcium tertiary phosphate and 4.0 parts by weight of PLURONIC F-68 (trade name for a product by ASAHI DENKA CO., LTD.) and stirred with sufficient flow of nitrogen gas.

Thereafter, 25 parts by weight of styrene monomer and 0.75 part by weight of SUNPEROX TO (trade name for a product by SANKEN KAKOU CO., LTD.) as a free radical initiator are added to the resulting reaction mixture. After elevating the temperature to 110° C. in 80 minutes, the reaction is continued for 1 hour. After cooling, styrene-grafted copolymer is taken out by filtration and the filtrate is washed sufficiently with pure water followed by drying under vacuum. Hereinafter, this modified ethylene propylene rubber is called "CR-1" for brevity.

(ii) Modified Ethylene-Propylene-Diene Rubber

In a stainless steel autoclave equipped with a stirrer are charged 100 parts by weight of ESPREN E-316 (trade name for ethylene-propylene-diene copolymer rubber (EPDM produced by SUMITOMO CHEMICAL CO., LTD.; $ML_{1+4}$ 121° C.=27) in the form of chips as the raw material rubber, 350 parts by weight of pure water, 4.0 parts by weight of calcium tertiary phosphate and 4.0 parts by weight of PLURONIC F-68 (trade name for a product by ASAHI DENKA CO., LTD.) and stirred with sufficient flow of nitrogen gas.

Thereafter, 12 parts by weight of styrene monomer and 0.75 part by weight of SUNPEROX TO (trade name for a product by SANKEN KAKOU CO., LTD.) as a free radical initiator are added to the resulting reaction mixture. After elevating the temperature to 110° C. in 80 minutes, the reaction is continued for 1 hour. After cooling, glycidyl methacrylate-grafted copolymer is taken out by filtration and the filtrate is washed sufficiently with pure water followed by drying under vacuum. Hereinafter, this modified ethylene-propylene-diene rubber is called "CR-2" for brevity.

(iii) Epoxy Group-Containing Copolymer

Epoxy group-containing copolymers are produced by the following method. That is, according to the method described in Japanese Patent Publications (Kokai) Nos. 47-23490 and 48-11888, a terpolymer of ethylene-vinyl acetate-glycidyl methacrylate of 80:7:13 (% by weight) having a melt flow rate of 10 g/10 minutes (190° C., load: 2.16 kg) is produced by high pressure radical polymerization method. Hereafter, the epoxy group-containing copolymers are called "E.GMA" for brevity.

The respective components are blended in proportions shown in Tables 5 and 6, kneaded and molded to produce resin compositions. They are compression molded to prepare test pieces and their physical properties are measured. The results obtained are shown in Tables 5 and 6.

Tables 5 and 6 clearly show that the thermoplastic resin compositions of Examples 20 to 27 in which the polyphenylene ether (component (a)) is blended with the modified propylene polymer grafted with styrene and glycidyl methacrylate and glycidyl acrylate (component (b)), and the rubbery substance (component (c)) exhibit much improved impact resistance than that of the resin composition of Comparative Example 9 in which the modified propylene polymer (component (b)) is absent.

TABLE 1

| Example No. (Comparative Example No.) | Resin Composition (% by weight) | | | | | |
|---|---|---|---|---|---|---|
| | Component (a) | Component (b) | | | | Component (c) |
| | Polyphenylene Ether | Modified Polypropylene MS-PP-1 | Maleic Anhydride-Modified Polypropylene M-PP-1 | Styrene-Modified Polypropylene S-PP-1 | Polypropylene *1 | Modified Ethylene-Based Copolymer Rubber MS-EPM-1 |
| 1 | 30 | 60 | 0 | 0 | 0 | 10 |
| (1) | 30 | 0 | 60 | 0 | 0 | 10 |
| (2) | 30 | 0 | 0 | 60 | 0 | 10 |
| (3) | 30 | 0 | 0 | 0 | 60 | 10 |
| 2 | 42 | 48 | 0 | 0 | 0 | 10 |
| 3 | 30 | 40 | 0 | 0 | 20 | 10 |

| Example No. (Comparative Example No.) | Physical Properties | | |
|---|---|---|---|
| | Izod Impact Strength (Notched, kg · cm/cm) | | Deflection Temperature under Load |
| | −30° C. | 23° C. | (4.6 kg/cm$^2$, °C.) |
| 1 | 9 | 16 | 111 |
| (1) | 3 | 7 | 91 |
| (2) | 4 | 8 | 86 |
| (3) | 2 | 5 | 72 |
| 2 | 10 | 18 | 121 |
| 3 | 7 | 12 | 107 |

*1 SUMITOMO NOBLEN AW564 (trade name, SUMITOMO CHEMICAL CO., LTD., MI = 9.0)

TABLE 2

Resin Composition (% by weight)

TABLE 2-continued

| Example No. (Comparative Example No.) | Component (a) Polyphenylene Ether | Component (b) Modified Polypropylene MS-PP-2 | Polypropylene *1 | Component (c) Rubbery Substance |
|---|---|---|---|---|
| 4 | 45 | 42 | 0 | 13*2 |
| 5 | 45 | 42 | 0 | 13*3 |
| 6 | 45 | 42 | 0 | 13*4 |
| 7 | 45 | 42 | 0 | 13*5 |
| 8 | 45 | 42 | 0 | 13*6 |
| 9 | 45 | 42 | 0 | 13*7 |
| 10 | 45 | 42 | 0 | 13*8 |
| 11 | 45 | 42 | 0 | 13*9 |
| 12 | 45 | 42 | 0 | 13*10 |
| 13 | 45 | 42 | 0 | 13*11 |
| (4) | 45 | 0 | 42 | 13*2 |
| (5) | 45 | 0 | 42 | 13*7 |

| Example No. (Comparative Example No.) | Physical Properties Izod Impact Strength (Notched, kg · cm/cm) | | Deflection Temperature under Load (4.6 kg/cm$^2$, °C.) |
|---|---|---|---|
| | −30° C. | 23° C. | |
| 4 | 12 | 21 | 134 |
| 5 | 9 | 16 | 126 |
| 6 | 7 | 13 | 115 |
| 7 | 10 | 15 | 109 |
| 8 | 8 | 16 | 101 |
| 9 | 14 | 22 | 105 |
| 10 | 11 | 17 | 107 |
| 11 | 8 | 12 | 111 |
| 12 | 7 | 9 | 118 |
| 13 | 7 | 10 | 108 |
| (4) | 4 | 6 | 91 |
| (5) | 5 | 8 | 79 |

*1 SUMITOMO NOBLEN AH561 (trade name, SUMITOMO CHEMICAL CO., LTD., MI = 3.0)
*2 Modified ethylene-propylene rubber; MS-EPM-2
*3 Styrene-modified ethylene-propylene rubber; S-EPM-1
*4 SUMITOMO ESPREN E-512P (trade name, SUMITOMO CHEMICAL CO., LTD., ML$_{1+4}$ 121° C. = 66)
*5 Polybutadiene; DIENE 35A (trade name, ASAHI KASEI CHEMICAL INDUSTRY CO., LTD.)
*6 Styrene-butadiene block copolymer rubber; CARIFLEX TR1116 (trade name, SHELL CHEMICAL CO., LTD.)
*7 Styrene-ethylene-propylene block copolymer; KRATON G1701X (trade name, SHELL CHEMICAL CO., LTD.)
*8 Styrene-isoprene block copolymer; KRATON D1107 (trade name, SHELL CHEMCIAL CO., LTD.)
*9 Styrene-butadiene rubber, SUMITOMO SBR 1507 (trade name, SUMITOMO CHEMICAL CO., LTD.)
*10 Ethylene-propylene rubber; SUMITOMO ESPREN E-100 (trade name, SUMITOMO CHEMICAL CO., LTD., ML$_{1+4}$ 100° C. = 43)
*11 Ethylene-vinyl acetate copolymer; SUMITOMO EVATATE 2021 (trade name, SUMITOMO CHEMICAL CO., LTD., vinyl acetate content; 10%)

TABLE 3

| Example No. (Comparative Example No.) | Resin Composition (parts by weight) | | | | |
|---|---|---|---|---|---|
| | Component (a) Polyphenylene Ether | Component (b) | | Component (c) | |
| | | Modified Polypropylene MS-PP-1 | Polypropylene *1 | Modified Ethylene-Propylene Copolymer MS-EPM-2 | Epoxy Group-Contaning Copolymer E · VA · GMA |
| 14 | 50 | 33 | 0 | 17 | 0 |
| 15 | 50 | 33 | 0 | 17 | 6 |
| 16 | 50 | 33 | 0 | 17 | 13 |
| (6) | 50 | 0 | 33 | 17 | 0 |

| Example No. (Comparative Example No.) | Physical Properties Izod Impact Strength (Notched, kg · cm/cm) | | Deflection Temperature under Load (4.6 kg/cm$^2$, °C.) |
|---|---|---|---|
| | −30° C. | 23° C. | |
| 14 | 10 | 18 | 158 |
| 15 | 12 | 23 | 152 |
| 16 | 15 | 29 | 150 |
| (6) | 5 | 11 | 131 |

*1 SUMITOMO NOBLEN AW564 (trade name, SUMITOMO CHEMICAL CO., LTD., MI = 9.0)

TABLE 4

| | Resin Composition (% by weight) | | | |
|---|---|---|---|---|
| Example No. | Component (a) | Component (b) | | Component (c) |
| | | Modified | Propylene | |

TABLE 4-continued

| (Comparative Example No.) | Polyphenylene Ether | Propylene Polymer | Polymer *1 | Rubbery Substance |
|---|---|---|---|---|
| 17 | 25 | BP-1 57 | 0 | EPR*2 18 |
| 18 | 25 | BP-1 37 | 20 | EPR*2 18 |
| 19 | 25 | BP-1 57 | 0 | SI*3 18 |
| (7) | 25 | 0 | 57 | EPR*2 18 |
| (8) | 25 | SP-1 57 | 0 | EPR*2 18 |

| | Physical Properties | | |
|---|---|---|---|
| Example No. (Comparative Example No.) | Izod Impact Strength (Notched, kg · cm/cm) | | Deflection Temperature under Load (4.6 kg/cm², °C.) |
| | −30° C. | 23° C. | |
| 17 | 10 | 22 | 112 |
| 18 | 9 | 19 | 105 |
| 19 | 13 | 26 | 103 |
| (7) | 4 | 8 | 86 |
| (8) | 6 | 13 | 100 |

*1 SUMITOMO NOBLEN AV664B (trade name, SUMITOMO CHEMICAL CO., LTD.)
*2 SUMITOMO ESPREN E-512F (trade name, SUMITOMO CHEMICAL CO., LTD.)
*3 KRATON D-1107 (trade name, SHELL CHEMICAL CO., LTD.)

TABLE 5

| | Resin Composition (% by weight) | | | |
|---|---|---|---|---|
| | | Component (b) | | |
| Example No. (Comparative Example No.) | Component (a) Polyphenylene Ether | Modified Propylene Polymer | Propylene Polymer *1 | Component (c) Rubbery Substance |
| 20 | 34 | BP-2 43 | 0 | CR-1*2 23 |
| 21 | 34 | BP-2 43 | 0 | CR-2*3 23 |
| 22 | 34 | BP-2 43 | 0 | EPR*4 23 |
| 23 | 34 | BP-2 43 | 0 | SEP*5 23 |
| 24 | 34 | BP-2 43 | 0 | E·GMA*6 23 |
| 25 | 34 | BP-2 43 | 0 | SEP*5 13   E·GMA*6 10 |
| (9) | 34 | 0 | 43 | CR-1*2 23 |

| | Physical Properties | | |
|---|---|---|---|
| Example No. (Comparative Example No.) | Izod Impact Strength (Notched, kg · cm/cm) | | Deflection Temperature under Load (4.6 kg/cm², °C.) |
| | −30° C. | 23° C. | |
| 20 | 8 | 17 | 137 |
| 21 | 9 | 20 | 135 |
| 22 | 5 | 11 | 140 |
| 23 | 12 | 23 | 113 |
| 24 | 13 | 25 | 105 |
| 25 | 16 | 27 | 114 |
| (9) | 3 | 8 | 102 |

*1 SUMITOMO NOBLEN FS1012 (trade name, SUMITOMO CHEMICAL CO., LTD.)
*2 Modified ethylene-propylene rubber
*3 Modified ethylene-propylene-diene rubber
*4 SIMITOMO ESPREN E-100 (trade name, SUMITOMO CHEMICAL CO., LTD.)
*5 KRATON G1701X (trade name, SHELL CHEMICAL CO., LTD.)
*6 Epoxy group-contaning copolymer

TABLE 6

| | Resin Composition (% by weight) | | | | |
|---|---|---|---|---|---|
| | | Component (b) | | | |
| Example No. (Comparative Example No.) | Component (a) Polyphenylene Ether | Modified Propylene Polymer | Propylene Polymer *1 | Component (c) Rubbery Substance | |
| 26 | 40 | BP-3 43 | 0 | SEP*2 11 | Natural Rubber 6 |
| 27 | 40 | BP-3 33 | 10 | SEP*2 11 | BR*3 6 |

TABLE 6-continued

| Example No. (Comparative Example No.) | Physical Properties | | Deflection Temperature under Load (4.6 kg/cm², °C.) |
|---|---|---|---|
| | Izod Impact Strength (Notched, kg · cm/cm) | | |
| | −30° C. | 23° C. | |
| 26 | 12 | 23 | 124 |
| 27 | 10 | 20 | 118 |

*¹SUMITOMO NOBLEN AD571 (trade name, SUMITOMO CHEMICAL CO., LTD.)
*²G1701X (trade name, SHELL CHEMICAL CO., LTD.)
*³DIENE R35A (trade name, ASAHI KASEI CHEMICAL INDUSTRY CO., LTD.)

EFFECT OF THE INVENTION

As described above, the present thermoplastic resin compositions of the present invention exhibit significant effects in that they not only have excellent mold-processibility but also show well balanced properties when molded into articles.

The novel resin compositions provided by the present invention can easily be processed into molded articles by mold-processing methods such as injection molding, extrusion molding, etc., used for the conventional polyphenylene ether-based thermoplastic resin compositions to give rise to molded articles having not only well-balanced physical properties such as impact resistance, heat resistance and hardness but also being excellent in the uniformity of appearance and in smoothness.

What is claimed is:

1. A thermoplastic resin composition comprising:
   (a) a polyphenylene ether resin or a resin composition containing a polyphenylene ether,
   (b)
      (i) a modified propylene polymer grafted with a styrene-based monomer and an unsaturated carboxylic acid or its derivative, or
      (ii) a propylene-based resin composition containing the modified propylene polymer and a propylene polymer, and
   (c) a rubbery substance.

2. A thermoplastic resin composition as claimed in claim 1, wherein the proportion of the component (a) to the sum of the components (a) and (b) is 1 to 90% by weight, and the proportion of the component (b) to the sum of the components (a) and (b) is 99 to 10% by weight, and wherein the proportion of the component (c) to the sum of the components (a) and (b) is 1 to 50 parts by weight per 100 parts by weight of the sum of the components (a) and (b).

3. A thermoplastic resin composition as claimed in claim 1, wherein the modified propylene polymer as the component (b) is a modified propylene polymer comprising 0.2 to 150 parts by weight, per 100 parts by weight of the propylene polymer, of a graft monomer composed of 99 to 1% by weight of the styrene-based monomer and 1 to 99% by weight of the unsaturated carboxylic acid, its derivative or mixture thereof and attached to the propylene polymer by graft copolymerization.

4. A thermoplastic resin composition as claimed in claim 1, wherein the modified propylene polymer as the component (b) is (i) a modified propylene polymer grafted with the styrene-based monomer, glycidyl methacrylate, glycidyl acrylate or mixture thereof, or (ii) a propylene-based resin composition containing the modified propylene polymer and the propylene polymer.

5. A thermoplastic resin composition as claimed in claim 1, wherein the component (c) is a rubbery substance graft-copolymerized with the styrene-based monomer.

6. A thermoplastic resin composition as claimed in claim 1, wherein the component (c) is an ethylene-α-olefin copolymer rubber.

7. A thermoplastic resin composition as claimed in claim 6, wherein the ethylene-α-olefin copolymer rubber is an ethylene-α-olefin copolymer rubber having an ethylene content of 15 to 85% by weight, a Mooney viscosity (ML$_{1+4}$, 121° C.) of 5 to 120, and a glass transition temperature of not higher than −10° C.

8. A thermoplastic resin composition as claimed in claim 1, wherein the component (c) is an epoxy group-containing copolymer.

9. A thermoplastic resin composition as claimed in claim 1, wherein the polyphenylene ether used as the component (a) is a polyphenylene ether obtainable by oxidative coupling polymerization of at least one phenol compound represented by the general formula (1)

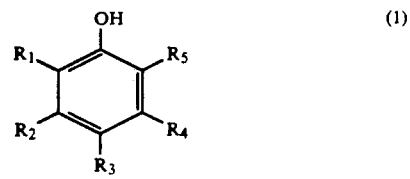

wherein $R_1$, $R_2$, $R_3$, $R_4$ and $R_5$ each represents a hydrogen atom, a halogen atom, a hydrocarbon group or a substituted hydrocarbon group, provided that one of $R_1$, $R_2$, $R_3$, $R_4$ and $R_5$ is a hydrogen atom.

10. An automotive part made from the thermoplastic resin composition claimed in any one of claims 1 to 4.

11. An automotive part as claimed in claim 10 which is selected from the group consisting of a bumper, instrument panel, fender, trim, door panel, wheel cover, side protector, garnish, trunk lid, bonnet and roof.

* * * * *